(12) United States Patent
Xu et al.

(10) Patent No.: US 11,072,134 B2
(45) Date of Patent: Jul. 27, 2021

(54) METHOD FOR SURFACE TREATMENT OF COMPOSITE MATERIAL PART AND TREATED PART

(71) Applicant: CITIC Dicastal CO., LTD., Hebei (CN)

(72) Inventors: Zuo Xu, Qinhuangdao (CN); Guoyuan Xiong, Qinhuangdao (CN); Ling Xiao, Qinhuangdao (CN); Jianqiang Cao, Qinhuangdao (CN); Lateng A, Qinhuangdao (CN); Donghui Zhang, Qinhuangdao (CN); Wei Zhang, Qinhuangdao (CN)

(73) Assignee: CITIC DICASTAL CO., LTD, Qinhuangdao (CN)

( * ) Notice: Subject to any disclaimer, the term of this patent is extended or adjusted under 35 U.S.C. 154(b) by 227 days.

(21) Appl. No.: 16/112,907

(22) Filed: Aug. 27, 2018

(65) Prior Publication Data
US 2019/0061289 A1    Feb. 28, 2019

(30) Foreign Application Priority Data
Aug. 25, 2017   (CN) .......................... 201710739130.0

(51) Int. Cl.
| | | |
|---|---|---|
| B29C 70/54 | (2006.01) | |
| B29C 70/48 | (2006.01) | |
| B29C 37/00 | (2006.01) | |
| B29C 71/00 | (2006.01) | |
| B29C 70/86 | (2006.01) | |
| B29L 31/32 | (2006.01) | |
| B29K 307/04 | (2006.01) | |

(52) U.S. Cl.
CPC ........ *B29C 70/545* (2013.01); *B29C 37/0025* (2013.01); *B29C 70/48* (2013.01); *B29C 70/86* (2013.01); *B29C 71/0009* (2013.01); *B29C 2071/0045* (2013.01); *B29K 2307/04* (2013.01); *B29L 2031/32* (2013.01)

(58) Field of Classification Search
CPC ....... B29C 70/545; B29C 70/86; B29C 70/48; B29C 70/34; B29C 70/36; B29C 37/0025; B05D 7/50; B05D 7/52; B05D 7/56; B05D 7/57
See application file for complete search history.

(56) References Cited

U.S. PATENT DOCUMENTS

| | | | | |
|---|---|---|---|---|
| 5,425,970 | A * | 6/1995 | Lahrmann | B05D 3/067 427/379 |
| 5,686,532 | A * | 11/1997 | Bederke | C08F 8/00 525/222 |
| 7,846,366 | B2 | 12/2010 | Iobst | |
| 10,570,265 | B2 * | 2/2020 | Cao | B05D 3/108 |
| 2004/0106707 | A1 * | 6/2004 | Su | C09D 11/101 524/105 |
| 2005/0236736 | A1 | 10/2005 | Formella | |
| 2009/0202826 | A1 * | 8/2009 | Sekido | B29C 70/547 428/365 |
| 2011/0036947 | A1 | 2/2011 | Knight | |
| 2013/0241100 | A1 | 9/2013 | Lownsdale | |

OTHER PUBLICATIONS

"Coating Materials—Cross-Cut Test", Jun. 2013; DIN EN ISO2409, ICS 87.040; National Preface; 23 pgs.
"National standard for salt spray test"; GB/6458-86; Salt Water Spray Test Method for Surface Treatment, 10 pgs.

* cited by examiner

*Primary Examiner* — Galen H Hauth
(74) *Attorney, Agent, or Firm* — Cooper Legal Group, LLC

(57) ABSTRACT

The disclosure provides a method for surface treatment of a composite material part and the prepared part. The method comprises the steps of: (1) providing a surface of a carbon fiber composite material part; (2) preparing a surface protection layer; (3) polishing the carbon fiber reinforced resin-based composite material surface after transparent powder is cured; (4) spraying transparent powder to the carbon fiber reinforced resin-based composite material surface after the transparent powder thereon is cured and curing it; (5) polishing the carbon fiber reinforced resin-based composite material surface after the transparent powder is cured; and (6) spraying a clear lacquer to the carbon fiber reinforced resin-based composite material surface after the transparent powder is cured and curing it.

16 Claims, No Drawings

METHOD FOR SURFACE TREATMENT OF COMPOSITE MATERIAL PART AND TREATED PART

CROSS-REFERENCE TO RELATED APPLICATIONS

This application is filed based upon and claims priority to Chinese Patent Application No. 201710739130.0, filed on Aug. 25, 2017, the contents of which are hereby incorporated by reference in its entirety.

BACKGROUND

1. Carbon Fiber Material and Carbon Fiber Hub

Carbon fibers are inorganic polymer fibers having a carbon content of more than 90%. The carbon fibers having a carbon content of more than 99% are referred to as graphite fibers. The micro-structures of carbon fibers are similar to those of artificial graphite and are turbostratic graphite structures. The spacing between carbon fiber layers is about 3.39 to 3.42 A, carbon atoms between the parallel layers are not as regular as graphite, and the layers are connected by means of Van der Waals' force. The carbon fibers are a new material with excellent mechanical properties. The carbon fibers have a tensile strength of about 2 to 7 GPa and a tensile modulus of about 200 to 700 GPa. The density is about 1.5 to 2.0 grams per cubic centimeter, which is mainly determined by the temperature of carbonization in addition to the structures of the raw fibers. Generally, the density can reach 2.0 grams per cubic centimeter by graphitization at a high temperature of 3000° C.

The carbon fiber material has a very low density, its density is lower than aluminum and less than ¼ of steel, and its specific strength is 20 times that of iron. The carbon fibers have a thermal expansion coefficient different from that of other fibers, and have the characteristic of anisotropy. The specific heat capacity of the carbon fibers is generally 7.12. The decrease in thermal conductivity with temperature rise is a negative value (0.72 to 0.90) parallel to the fiber direction and a positive value (32 to 22) perpendicular to the fiber direction. The specific resistance of carbon fibers is related to the type of the fibers. At 25° C., the high modulus is 775, and the high-strength carbon fibers are 1500 per centimeter. Thus, the carbon fibers have the highest specific strength and specific modulus among all high-performance fibers. Compared with titanium, steel, aluminum and other metal materials, the carbon fibers have the characteristics of high strength, high modulus, low density, small coefficient of linear expansion and the like on physical properties, and can be called the king of new materials. In addition to the characteristics of ordinary carbon materials, the carbon fibers have remarkable anisotropic softness, can be processed into various fabrics, and show high strength along the fiber axes due to their small specific gravity. Carbon fiber reinforced epoxy resin composite materials have the highest comprehensive indexes including specific strength and specific modulus among the existing structural materials.

After the carbon fiber material is formed by resin bonding, it has excellent properties such as high mechanical strength and low density, and is often used in bicycle bodies, automobile bodies, automobile hubs and other occasions. When it is used to manufacture a carbon fiber hub, the weight of the hub can be reduced by more than 30% compared with an aluminum alloy hub, so it has a broad prospect of weight reduction.

2. Product Surface Identification

In order to track a product and achieve product quality traceability, it is often necessary to add a logo to the product. The common logo includes characters added to the aluminum alloy wheel by a coder or a mold. The characters may mark the manufacturer, target customer, production team, production date, quality inspector number, etc. Through the above coding and marking, effective traceability of quality can be achieved. However, this conventional technique is difficultly used for marking and coding of carbon fiber composite material parts. The carbon fiber composite material parts are difficult to manufacture by machining and costly, have high requirements for equipment and tools, and are difficultly formed and marked by the above method.

SUMMARY

The disclosure relates to the field of surface treatment of composite materials, and specifically, relates to a method for surface treatment of a composite material part and the treated part.

Disclosed herein are a method for surface treatment of a composite material part and the treated part, thereby effectively improving the surface effect of a carbon fiber composite material wheel and improving the weather resistance and aging resistance of the wheel.

The disclosure provides a method for surface treatment protection of a carbon fiber reinforced resin-based composite material. By adopting a protection system of acrylic resin+ acrylic transparent powder+ acrylic clear lacquer, the surface effect of the carbon fiber reinforced resin-based composite material can be effectively improved and the reliability of the relevant product is improved.

In one embodiment of the disclosure, a method for surface treatment of a composite material part is provided. The method comprises the steps of: (1) providing a surface of a carbon fiber composite material part; (2) preparing a surface protection layer: firstly, laying a carbon fiber twill on the surface of the carbon fiber composite material part, then closing a mold, and introducing, heating, curing and molding acrylic resin; and then spraying transparent powder to the formed surface and curing it; (3) polishing the carbon fiber reinforced resin-based composite material surface after the transparent powder is cured; (4) spraying transparent powder to the carbon fiber reinforced resin-based composite material surface after the transparent powder thereon is cured and curing it; (5) polishing the carbon fiber reinforced resin-based composite material surface after the transparent powder is cured; and (6) spraying a clear lacquer to the carbon fiber reinforced resin-based composite material surface after the transparent powder is cured and curing it; the curing temperature of the transparent powder is within 180° C.

In one embodiment of the disclosure, in step (1), the surface of the carbon fiber composite material part is prepared according to the following method: preparing a structural layer of a wheel from a pre-preg of T700, 12K carbon fiber reinforced epoxy resin, specifically, preparing a composite material wheel using a winding process and an autoclave process, the molding temperature being 150° C., and the molding pressure being 0.5 MPa.

In one embodiment of the disclosure, in step (2), the carbon fiber twill is 2-4 layers of T300, 3k carbon fiber twill.

In one embodiment of the disclosure, in step (2), the transparent powder is acrylic transparent powder, and has a thickness of 40 to 60 microns.

In one embodiment of the disclosure, in step (2), the step of introducing the acrylic resin is completed by an RTM process.

In one embodiment of the disclosure, in step (3), the surface is polished using sandpaper of 800-1000 meshes, cleaned with deionized water, and then baked at 70-80° C. for 40-50 minutes.

In one embodiment of the disclosure, in step (4), the transparent powder is acrylic transparent powder, and has a thickness of 60 to 80 microns.

In one embodiment of the disclosure, in step (5), the surface is polished using sandpaper of 800 meshes, cleaned with deionized water, and baked at 60-80° C. for 40-60 minutes by infrared heating.

In one embodiment of the disclosure, in step (6), the clear lacquer is an acrylic clear lacquer, and has a thickness of 15 to 20 microns.

The disclosure further provides a part prepared by the above method.

Also, provided is a method for surface treatment of a carbon fiber reinforced resin-based composite material wheel, in which the wheel is divided into a structural layer and a surface protection layer, and the specific method steps are as follows:

Step 1: preparing the structural layer: preparing the structural layer of the wheel from a pre-preg of T700, 12K carbon fiber reinforced epoxy resin, specifically, preparing a composite material wheel using a winding process and an autoclave process, the molding temperature being 150° C., and the molding pressure being 0.5 MPa;

Step 2: preparing the surface protection layer: firstly, laying two layers of T300, 3k carbon fiber twill on the surface of the structural layer, then closing a mold, introducing acrylic resin into the mold by adopting an RTM process (resin transfer molding process) to completely impregnate the carbon fiber twill, then heating, curing and molding the acrylic resin, spraying transparent powder to the carbon fiber reinforced resin-based composite material surface and curing it, the thickness of the transparent powder being 40 to 60 microns; Step 3: polishing the carbon fiber reinforced resin-based composite material surface after the transparent powder is cured: (1) polishing with 800-mesh sandpaper; (2) cleaning with deionized water; and (3) baking at 80° C. for 40 minutes;

Step 4: spraying transparent powder to the carbon fiber reinforced resin-based composite material surface after the transparent powder thereon is cured and curing it, the thickness of the transparent powder being 60 to 80 microns;

Step 5: polishing the carbon fiber reinforced resin-based composite material surface after the transparent powder is cured: (1) polishing with 800-mesh sandpaper; (2) cleaning with deionized water; and (3) baking at 80° C. for 40 minutes; and Step 6: spraying a clear lacquer to the carbon fiber reinforced resin-based composite material surface after the transparent powder is cured and curing it, the thickness of the transparent lacquer being 15 to 20 microns.

The technical solution of the disclosure has the advantages that: by adopting a protection system of acrylic transparent powder+ acrylic transparent powder+ acrylic clear lacquer, the surface effect of the carbon fiber reinforced resin-based composite material can be effectively improved and the reliability of the relevant product is improved.

DETAILED DESCRIPTION

Embodiment 1

The carbon fiber reinforced resin-based composite material used was a carbon fiber reinforced resin-based composite material having an epoxy resin content of 40%. In this embodiment, carbon fiber reinforced resin-based composite material wheels were specifically selected. Three identical carbon fiber reinforced resin-based composite material wheels were selected for the following tests.

A structural layer of each composite material wheel was prepared: the structural layer of each wheel was prepared from a pre-preg of T700, 12K carbon fiber reinforced epoxy resin, specifically, each composite material wheel was prepared using a winding process and an autoclave process, the molding temperature being 150° C., and the molding pressure being 0.5 MPa.

Two layers of T300, 3k carbon fiber twill was laid on the surface of the structural layer of composite material wheel, then a mold was closed, acrylic resin was introduced into the mold by adopting an RTM process (resin transfer molding process) to completely impregnate the carbon fiber twill, and then the acrylic resin was heated, cured and molded to obtain a carbon fiber reinforced resin-based composite material wheel.

The surface of the carbon fiber reinforced resin-based composite material wheel was polished with 800-mesh 3M sponge sandpaper, then cleaned with deionized water, dried by cold air and heated with infrared for 40 minutes.

Subsequently, the surface of the carbon fiber reinforced resin-based composite material wheel was sprayed with transparent powder using a Wagner powder sprayer, and the transparent powder had a thickness of 40 to 60 microns and was cured at 177° C. for 17 minutes. The transparent powder used was acrylic transparent powder, which was purchased from AkzoNobel Powder Coatings Co., Ltd. under the number 158C121.

The cured carbon fiber reinforced resin-based composite material wheel was polished with 800-mesh 3M sponge sandpaper, then cleaned with deionized water, dried by cold air and heated with infrared for 40 minutes.

Subsequently, the surface of the carbon fiber reinforced resin-based composite material wheel was sprayed with transparent powder using the Wagner powder sprayer, and the transparent powder had a thickness of 60 to 80 microns and was cured at 177° C. for 17 minutes. The transparent powder used was acrylic transparent powder, which was purchased from AkzoNobel Powder Coatings Co., Ltd. under the number 158C121.

The carbon fiber reinforced resin-based composite material wheel was polished with 800-mesh 3M sponge sandpaper, then cleaned with deionized water, dried by cold air and heated with infrared for 40 minutes.

A clear lacquer was sprayed to the surface of the carbon fiber reinforced resin-based composite material wheel and cured, and the clear lacquer had a thickness of 15 to 20 microns and was cured at 150° C. for 15 minutes. The clear lacquer was acrylic lacquer, which was purchased from German LANKWITZER company under the number RF20-0007/1.

Embodiment 2

The carbon fiber reinforced resin-based composite material used was a carbon fiber reinforced resin-based composite material having an epoxy resin content of 40%. In this embodiment, carbon fiber reinforced resin-based composite material wheels were specifically selected. Three identical carbon fiber reinforced resin-based composite material wheels were selected for the following tests.

A structural layer of each composite material wheel was prepared: the structural layer of wheel was prepared from a pre-preg of T700, 12K carbon fiber reinforced epoxy resin, specifically, composite material wheel was prepared using a winding process and an autoclave process, the molding temperature being 150° C., and the molding pressure being 0.5 MPa.

Two layers of T300, 3k carbon fiber twill was laid on the surface of the structural layer of composite material wheel, then a mold was closed, acrylic resin was introduced into the mold by adopting an RTM process (resin transfer molding process) to completely impregnate the carbon fiber twill, and then the acrylic resin was heated, cured and molded to obtain a carbon fiber reinforced resin-based composite material wheel.

The surface of the carbon fiber reinforced resin-based composite material wheel was polished with 800-mesh 3M sponge sandpaper, then cleaned with deionized water, dried by cold air and heated with infrared for 40 minutes.

A clear lacquer was sprayed to the surface of the carbon fiber reinforced resin-based composite material wheel and cured, and the clear lacquer had a thickness of 15 to 20 microns and was cured at 150° C. for 15 minutes. The clear lacquer was acrylic lacquer, which was purchased from German LANKWITZER company under the number RF20-0007/1.

Embodiment 3

Quality of Composite Material Wheels of Embodiments 1 and 2

As measured by an ED300 eddy current thickness gauge, the average powder thickness of the first layer of transparent powder on the surface of the composite material wheel in embodiment 1 was 41 μm, the average thickness after the second layer of transparent powder was sprayed was 110 μm, and the average thickness after the clear lacquer was sprayed was 127 μm. The thickness of the clear lacquer on the surface of the composite material wheel in embodiment 2 was 19 μm.

Observed under a light box, the surface of the composite material wheel in embodiment 1 was smooth and had no obvious defects, and thus met the product requirements; the surface of the composite material wheel in embodiment 2 had pits of different sizes, and thus did not meet the product requirements.

Tested by a DIN EN ISO 2409 method, the surface of the composite material wheel in embodiment 1 had a characteristic value of level 0 by cross-cut detection, which met the product requirements; the surface of the composite material wheel in embodiment 2 had a characteristic value of level 3 by cross-cut detection, which did not meet the product requirements.

The invention claimed is:

1. A method for surface treatment of a composite material part, wherein the method comprises the steps of: (1) providing a surface of a carbon fiber composite material part; (2) preparing a surface protection layer: firstly, laying a carbon fiber twill on the surface of the carbon fiber composite material part, then closing a mold, and introducing, heating, curing and molding acrylic resin, such that a carbon fiber reinforced resin-based composite material surface is formed; and then spraying first transparent powder on the carbon fiber reinforced resin-based composite material surface and curing the first transparent powder; (3) polishing the carbon fiber reinforced resin-based composite material surface after the first transparent powder is cured; (4) spraying second transparent powder on the carbon fiber reinforced resin-based composite material surface obtained from step (3) and curing the second transparent powder; (5) polishing the carbon fiber reinforced resin-based composite material surface after the second transparent powder is cured; and (6) spraying a clear lacquer on the carbon fiber reinforced resin-based composite material surface obtained from step (5) and curing the clear lacquer by heating; a curing temperature when the first transparent powder or the second transparent powder is cured is less than 180° C., wherein in step (1), the surface of the carbon fiber composite material part is prepared according to the following method: preparing a structural layer of a composite material wheel from a pre-preg of carbon fiber reinforced epoxy resin, wherein the composite material wheel is prepared using a winding process and an autoclave process, with a molding temperature being 150° C., and a molding pressure being 0.5 MPa.

2. The method according to claim 1, wherein in step (2), the carbon fiber twill is 2-4 layers of carbon fiber twill.

3. The method according to claim 1, wherein in step (2), the first transparent powder is acrylic transparent powder, and has a thickness of 40 to 60 microns.

4. The method according to claim 1, wherein in step (2), the step of introducing the acrylic resin is completed by a resin transfer molding (RTM) process.

5. The method according to claim 1, wherein in step (3), the carbon fiber reinforced resin-based composite material surface is polished using sandpaper of 800-1000 meshes, cleaned with deionized water, and then baked at 70-80_° C. for 40-50 minutes.

6. The method according to claim 1, wherein in step (4), the second transparent powder is acrylic transparent powder, and has a thickness of 60 to 80 microns.

7. The method according to claim 1, wherein in step (5), the carbon fiber reinforced resin-based composite material surface is polished using sandpaper of 800 mesh, cleaned with deionized water, and baked at 70-80_° C. for 40-60 minutes by infrared heating.

8. The method according to claim 1, wherein in step (6), the clear lacquer is an acrylic clear lacquer, and has a thickness of 15 to 20 microns.

9. A composite material part obtained by the method of claim 1.

10. A composite material part obtained by the method of claim 2.

11. A composite material part obtained by the method of claim 3.

12. A composite material part obtained by the method of claim 4.

13. A composite material part obtained by the method of claim 5.

14. A composite material part obtained by the method of claim 6.

15. A composite material part obtained by the method of claim 7.

16. A composite material part obtained by the method of claim 8.

* * * * *